US008393431B2

(12) United States Patent
Swasey et al.

(10) Patent No.: US 8,393,431 B2
(45) Date of Patent: Mar. 12, 2013

(54) OMNIDIRECTIONAL DRIVE AND STEERING UNIT

(75) Inventors: Merin J. Swasey, North Logan, UT (US); Stanley J. Checketts, Providence, UT (US)

(73) Assignee: Boomerang Systems, Inc., Morristown, NJ (US)

( * ) Notice: Subject to any disclaimer, the term of this patent is extended or adjusted under 35 U.S.C. 154(b) by 359 days.

(21) Appl. No.: 12/688,825

(22) Filed: Jan. 15, 2010

(65) Prior Publication Data

US 2010/0181136 A1 Jul. 22, 2010

Related U.S. Application Data

(60) Provisional application No. 61/258,006, filed on Nov. 4, 2009, provisional application No. 61/248,448, filed on Oct. 3, 2009, provisional application No. 61/145,543, filed on Jan. 17, 2009.

(51) Int. Cl.
*B60K 17/30* (2006.01)

(52) U.S. Cl. ........................................ 180/252; 180/411

(58) Field of Classification Search .................. 180/252, 180/411
See application file for complete search history.

(56) References Cited

U.S. PATENT DOCUMENTS

| 3,534,825 A * | 10/1970 | Reffle ............................ 180/252 |
| 3,583,639 A * | 6/1971 | Cornelius ...................... 239/745 |
| 4,461,367 A * | 7/1984 | Eichinger et al. ............. 180/252 |
| 4,513,839 A * | 4/1985 | Nieminski et al. ............. 180/253 |
| 4,683,973 A * | 8/1987 | Honjo et al. ................... 180/252 |
| 6,491,127 B1 * | 12/2002 | Holmberg et al. ............. 180/252 |
| 7,591,340 B2 * | 9/2009 | Scharfenberg et al. ........ 180/252 |
| 7,747,349 B2 * | 6/2010 | Yeh et al. ....................... 700/245 |
| 2006/0289218 A1 * | 12/2006 | Allen ............................. 180/252 |
| 2007/0150096 A1 * | 6/2007 | Yeh et al. ....................... 700/245 |

FOREIGN PATENT DOCUMENTS

| JP | 2002061736 | 2/2002 |
| JP | 2003156129 | 5/2003 |
| JP | 2003194157 | 7/2003 |

OTHER PUBLICATIONS

International Search Report and Written Opinion for corresponding international application No. PCT/US2010/021284 mailed May 17, 2010.

* cited by examiner

*Primary Examiner* — Kevin Hurley
(74) *Attorney, Agent, or Firm* — Graham Curtin, PA (57) ABSTRACT

A compact, low profile omnidirectional drive and steering unit that, in one embodiment, utilizes a single, centrally located wheel, mounted on a drive shaft, upon which is also mounted a tapered pinion gear. The pinion gear on the drive shaft meshes with a ring shaped beveled worm gear contained within the outer housing of the gear unit that surrounds the centrally located wheel. At one side of the outer housing is a worm drive that meshes with the ring shaped and beveled worm gear. Rotation of the worm drive causes rotation of the ring shaped worm gear, which causes the drive shaft mounted pinion gear to turn, which turns the drive wheel to provide driving power for whatever vehicle or system of which the unit is a part. A steering and timing gear is mounted on the lower surface of the unit to provide steering capability.

7 Claims, 12 Drawing Sheets

```
┌─► Press Outside Diameter Contact Bearing into the Bevel Gear.
├─► Adjust the shape of the No.1 Snap Ring as required.
├─► Install No. 1 Snap Ring into snap ring groove in the Bevel Gear.
├─► Insert the Dowel Pins into the Bevel Gear.
├─► Press Gear Mounting ring onto Bevel Gear over Dowel pins.
├─► Press Dowel Pins flush with surface of Gear Mounting Ring.
├─► Attach Gear Mounting Ring to Bevel Gear by the means of Allen Head screws.
├─► Seat Dowel Pins into Worm Gear.
├─► Align Gear Mounting Ring of the Ring/Bevel gear Assembly with the dowel Pins in the Worm Gear.
├─► Secure the Worm Gear to the Gear Mounting Ring/Bevel Gear assembly with machine screws.
├─► Insert Top Wheel Support into the Worm Gear, Gear Mounting Ring and the Bevel Gear Assembly.
└─► Flip Assembly over and install two dowel pins.
```

FIG. 4

```
┌─► Insert the Outside Diameter Contact Bearing in place on the Upper Case and press into position below the Snap Ring groove.
├─► Adjust the shape of the No. 2 Snap Ring as required and insert into the snap ring groove in the Upper Case.
└─► Apply gasket sealant to the mating surfaces of the Bearing Cap and Top Wheel Support. Place Bearing Cap on Top Wheel Support with screw holes in Bearing Cap aligned with threaded holes in Top Wheel Support.
```

```
┌─ Press Wheel Drive Shaft into the Drive Wheel along with the long Key in
│  the keyway until the snap ring groove on the distal end of the Drive
│  Shaft passes beyond the outside of the Drive Wheel.
└→ Install Snap Ring into snap ring groove and press Drive Wheel against
┌─ the Snap Ring then place a Laminated Shim on the Drive Shaft on top of
│  the Snap Ring.
└→ Place a second Laminated Shim on the Drive Shaft on the opposite side
   of the Drive Wheel. The distance between the shims on either side of the
┌─ Drive Wheel should be ~3.125 inches. Some adjustment of the Laminated
│  Shims may be required.
└→ Position the Drive Shaft Bearings on the Drive Shaft on either side of
┌─ the Drive Wheel.
└→ Place the Pinion Gear on the Drive shaft with a Snap Ring, not using
┌─ the Short Key.
└→ Make corrections in the position of the Pinion Gear by adjusting the
┌─ Laminated Shims on either side of the Drive Wheel
└→ Remove the Pinion Gear from the drive Shaft to Install the Oil seal over
   the Drive Shaft and then replace the Pinion Gear with the Short Key and
┌─ Snap Ring.
└→ All parts to be lubricated at assembly as required
```

FIG. 7

```
┌─ Coat mating surfaces of the top Wheel Support and
│  Upper Wheel Bearing Support with gasket sealant.
└→ Position Top Wheel support over the Upper Wheel
┌─ Bearing Support using the alignment Dowel Pins.
└→ Coat the mating surfaces of Upper Wheel Bearing Support and
┌─ lower Wheel Bearing Housing with gasket sealant.
└→ Place Wheel and Pinion Gear Assembly into Upper Wheel
┌─ Bearing Support.
└→ Place the Lower Wheel Bearing housing onto the Dowel
┌─ Pins extending from the Upper Wheel Bearing Support.
└→ Secure the Top Wheel Support, Upper wheel bearing Support and the
   Lower Wheel Bearing Housing by the means of machine screws.
```

```
┌─ Press the Lower Case Oil seal into the Lower Case.

├─ Turn Lower Case over on the work surface and apply gasket sealant to
│  mating edges of both Upper Case and Lower Case.

├─ Lightly grease the seal mating surface where Lower Wheel Bearing
│  Housing will meet the Lower Case Oil Seal.

├─ Put Lower Case Assembly on to Upper Case Assembly and press the
│  lip of the Lower Case Oil Seal in around the edge of the Lower Wheel
│  Support to ensure an even fit and adequate seal.

├─ Insert and start Allen head machine screws which join the Upper Case
│  to the Lower Case. After all screws are started, tighten the three screws
│  in the rectangular area above the Worm     until they are snug and
│  the gasket cement squeezes out. Then proceed to snug the remaining
│  screws. Once all screws are snug, tighten all case joining screws to
│  secure Lower Case to Upper Case.

├─ Turn the Case Assembly over, and determine where the Pinion Gear is
│  currently positioned relative to the Bearing Cap and place a finger on
│  the Bearing Cap in that location. Keeping that spot marked, turn the
│  Case Assembly back over and set securely on the work surface. Using
│  a hammer and center punch, make a series of punch marks in the
│  Bearing Cap roughly resembling an arrow shape, pointing to the location
│  directly over the Pinion Gear.

├─ Start Worm Seal slightly in to Worm Seal Mounting Plate with the "open"
│  side of the seal going in towards the stop machined into the Worm Seal
│  hole. Place Worm Seal and Worm Seal Mounting Plate
│  in arbor press, Worm Seal side up, making sure Worm Seal Mounting
│  Plate is squared and centered under arbor press and press seal in to the
│  Worm Seal Mounting Plate.

— From FIG. 11A

Slide a Worm Seal Block with the seal to the outside on to one side of the Worm Shaft and align so that the screw holes in the Worm Seal Block align with the threaded holes in the Upper Case and Lower Case assembly.

Apply Gasket Sealant to the non-seal face of the Worm Seal Blocks and their mating surface on Upper Case and Lower Case Assembly and attach by the means of four Allen head cap screws.

Place Dowel Pins in dowel pin holes in Bottom Wheel Housing, tap with hammer to seat as needed.

Install Gear Oil Drain Plug in Lower Case until the top of the Drain Plug is flush with the exterior of the Lower Case

Align dowel pin holes in Steering and Timing Gear with dowel pins in Bottom Wheel Housing and hand press into place. Secure with four Flat Head Socket Cap Machine Screws and tightening them in place.

Place a bead of Permatex Ultra Black RTV Sealant around top edge of Upper Case. Put transparent Top Cover in place. Start, but do not tighten Allen head screws. Snug screws in place so that Top Cover and sealant form a uniform and secure bond, but not so tight that cover is pressed all of the way down to touch the metal. Set aside for about one hour to allow sealant to begin to cure. Return and tighten screws until the srews are tight and the Top Cover is secure

OMNIDIRECTIONAL DRIVE AND STEERING UNIT

CROSS-REFERENCE TO RELATED APPLICATIONS

This application claims the benefit of U.S. Application 61/145,543, filed Jan. 17, 2009, U.S. Application 61/248,448, filed Oct. 3, 2009, and U.S. Application 61/258,006, filed Nov. 4, 2009, the contents of each of which are incorporated herein by reference.

FIELD OF THE INVENTION

The present invention relates to a wheel drive and steering unit for, in one embodiment, automatic guided vehicles (AGVs) and other semi-automatic or manually controlled vehicles. More particularly, the present invention relates to a compact and low profile drive and steering unit that has a unique ability to fully rotate a vehicle around its central vertical axis, and to drive or move a vehicle in any direction without altering the orientation of the vehicle.

BACKGROUND OF THE INVENTION

Conventional AGVs rely upon gear units that house separate drive and steering components that are adjacent to a load carried by a vehicle. For example, conventional AGVs employ two turnable and two non-turnable wheels, much like a forklift, where the drive and steering mechanisms are adjacent to the load. That design simplifies the mechanical components of the system, but limits the amount of the load a vehicle can carry and the maneuverability of the vehicle. The load is limited because the placement of the drive and steering components adjacent to the load increases the top-heaviness of the vehicle. Maneuverability is constrained because only two wheels are capable of turning.

In addition, existing omnidirectional drive and steering units are relatively delicate in construction, large in design, and provide minimal power for steering, drive, and load bearing functions relative to the overall size of the unit.

SUMMARY OF THE INVENTION

The present invention discloses, in one embodiment, a compact wheel drive and steering system that is preferably placed under a load, or in one example a vehicle, rather than adjacent thereto, and that is capable of rotating a vehicle to any degree around its central vertical axis, and of moving a vehicle in any direction without altering its orientation or that of a load.

The placement of the system under a vehicle increases the load capability, and the omnidirectional nature of the drive and steering system improves maneuverability and reduces the space or area necessary for vehicle operation. For example, an AGV equipped with one or more omnidirectional steering and drive units of the present invention working in a coordinated fashion, operating in an automated parking facility, can slide under an automobile because of the placement and compactness of the drive and steering units, lift the automobile and turn around without using a turntable or making a U-turn in an arc, travel for a distance and deposit the automobile in a storage space or aisle that is normal to the direction of the vehicle without changing the orientation of the vehicle or using floor space for the arc required for a vehicle turning radius.

The omnidirectional drive and steering system of the present disclosure provides an AGV or other vehicle with multidirectional travel capability, the ability to turn 360° so that vehicles can be driven forward into the structure and also driven forward when exiting the structure, and a more efficient mode of maneuvering automobiles to and from storage within the system which can increase system efficiency and significantly decrease costs associated with storage system footprint, construction and maintenance.

One aspect of the invention is to provide a drive and steering unit that is very low profile and compact, and that is capable of transporting heavy loads. Another aspect is to provide a drive and steering unit that does not require changing gears to reverse directions. Another aspect is to provide a device where the drive and steering unit can be placed directly below the load providing a 360° turning capability within the diameter of the footprint of the load. Another aspect is to provide a drive function that operates independent of the steering function within a low profile, compact housing.

BRIEF DESCRIPTION OF THE DRAWINGS

The accompanying drawings, which are incorporated in and form a part of this specification, illustrate certain embodiments of an omnidirectional drive and steering unit and together with the description, serve to explain certain aspects of the principles of this application.

FIG. 7 is a flow diagram of the assembly of one embodiment of a wheel and pinion gear assembly of the invention.

FIG. 8 is a flow diagram of the assembly of one embodiment of a wheel housing assembly of the invention.

FIGS. 11A and 11B are a flow diagram of the assembly of one embodiment of a case assembly of the invention.

DETAILED DESCRIPTION OF THE PREFERRED EMBODIMENTS

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 1:
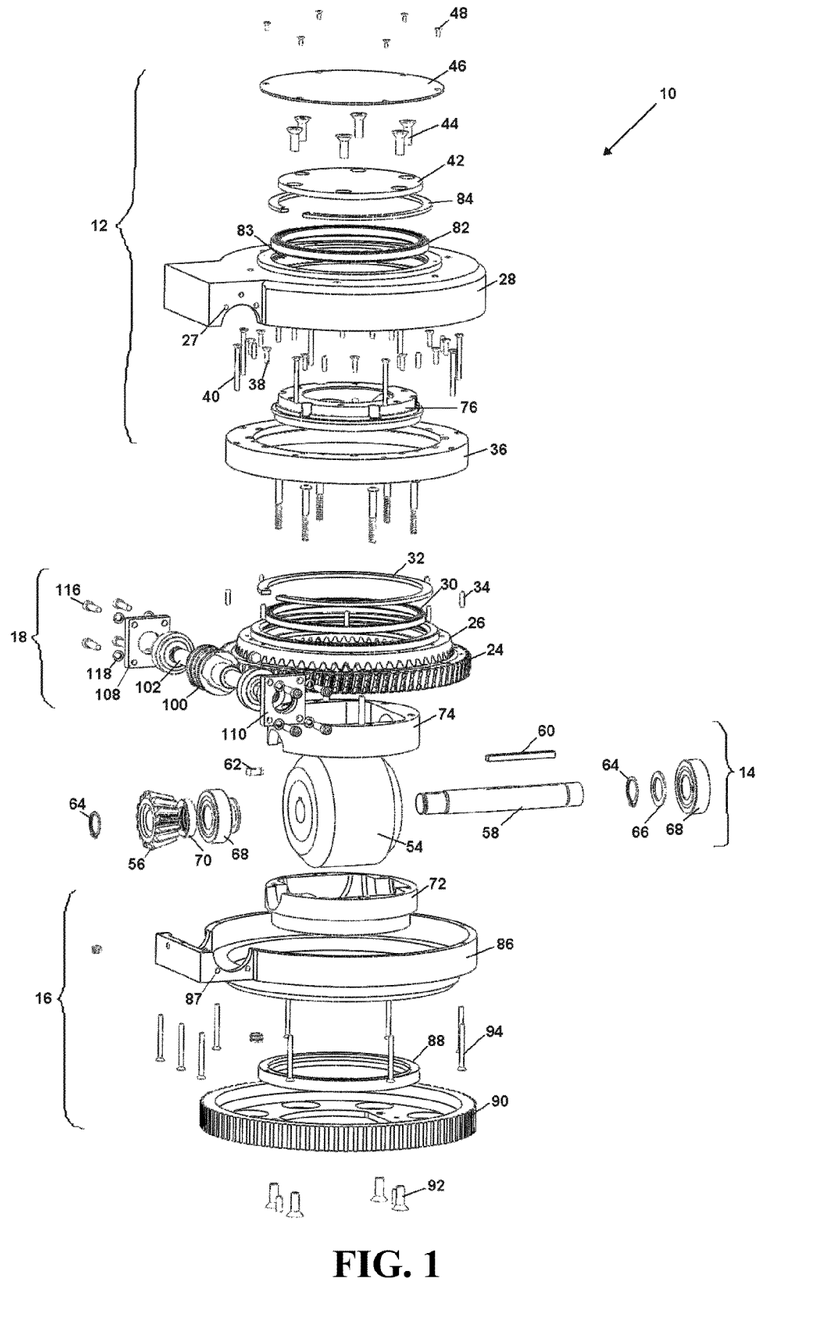
FIG. 1 is an exploded view of an omnidirectional drive and steering unit of the present invention.
Figure 3:
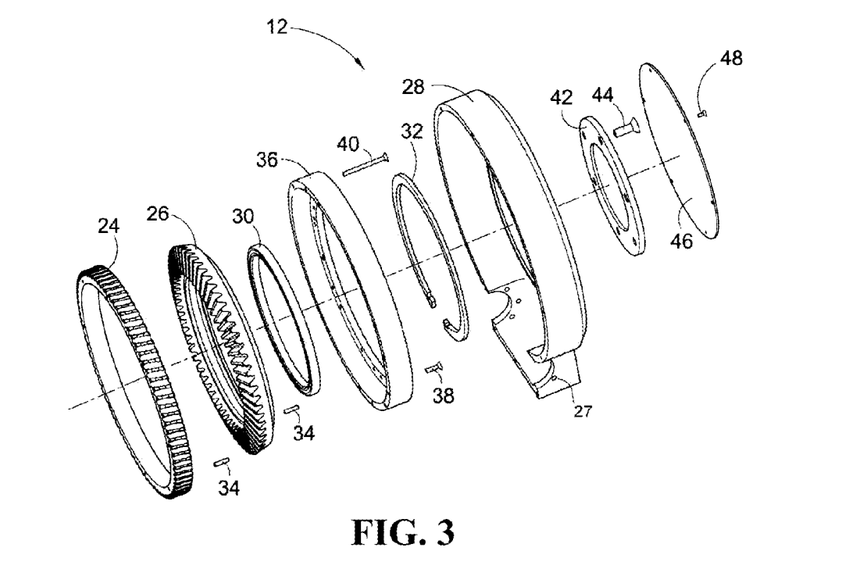
FIG. 3 is an exploded view of one aspect of an upper case assembly of the invention.
Figure 6:
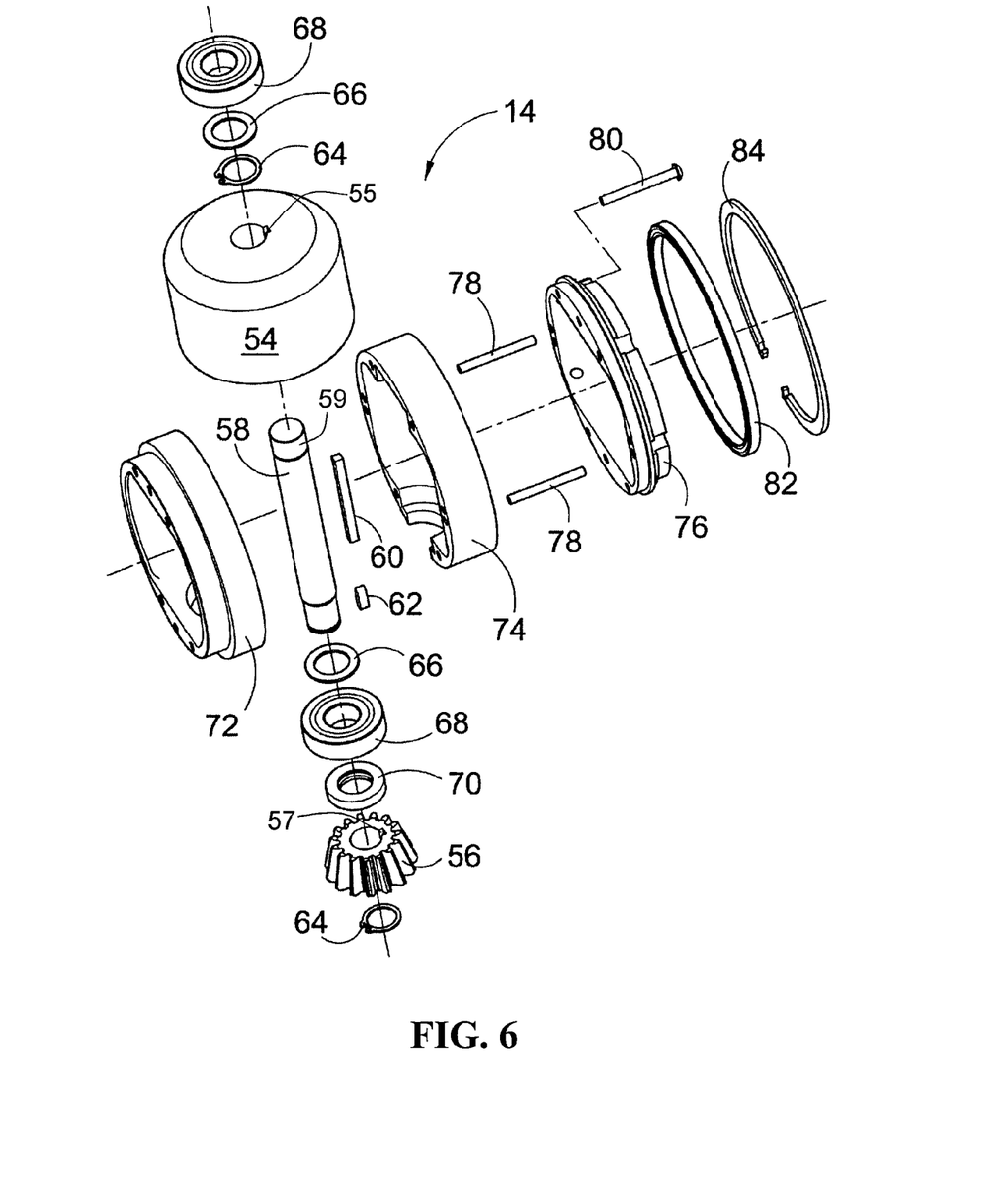
FIG. 6 is an exploded view of one embodiment of a wheel pinion gear and wheel housing assembly of the invention.
Figure 9:
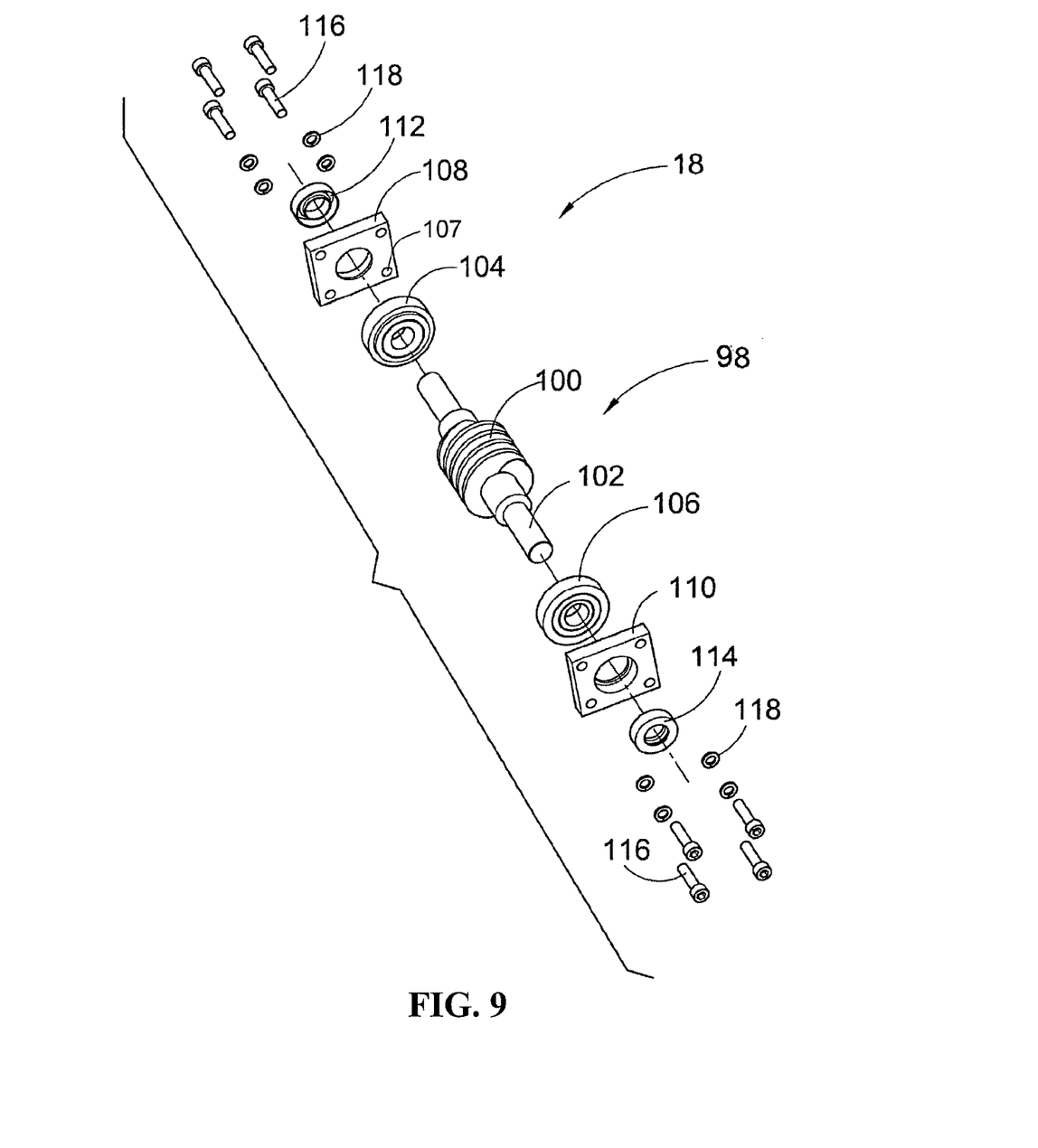
FIG. 9 is an exploded view of one embodiment of a worm gear assembly of the invention.
Figure 10:
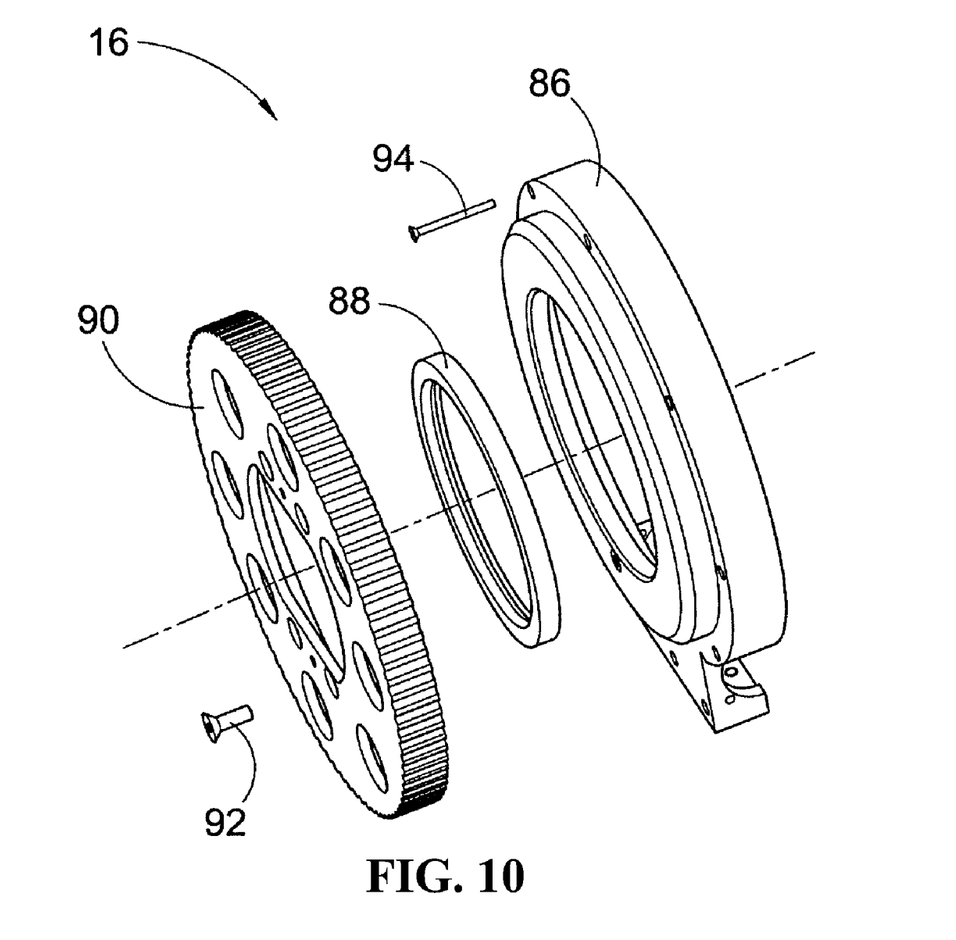
FIG. 10 is an exploded view of one embodiment of a lower case assembly of the invention.

FIG. 1 is an exploded view of one embodiment of an omnidirectional drive and steering unit 10 (hereinafter referred to as unit 10) generally comprising an upper case assembly 12, a lower case assembly 16, a wheel housing assembly 14 enclosing a wheel 54, and a drive assembly 18. One embodiment of a method of assembly of each generally-referenced region is further illustrated in the figures that follow, where FIG. 3 illustrates one embodiment of an assembly of the upper case assembly 12, FIG. 10 illustrates one embodiment of an assembly of the lower case assembly 16, FIG. 6 illustrates one embodiment of an assembly of the wheel housing assembly 14, and FIG. 9 illustrates one embodiment of an assembly of the drive assembly 18. As will be described in more detail below, the upper and lower case assemblies 12, 16 are preferably fixed relative to an AGV (FIG. 17), for example, to which the unit 10 is attached. The drive assembly 18 is adapted for rotating the wheel 54 either forward or backward without switching drive gears, while the wheel housing assembly 14 is rotatably steered within the upper and lower case assemblies 12, 16 through engagement with a steering gear 90. As will be further described below, the wheel 54 can be driven and steered or turned independently or simultaneously as desired.

Figure 2:
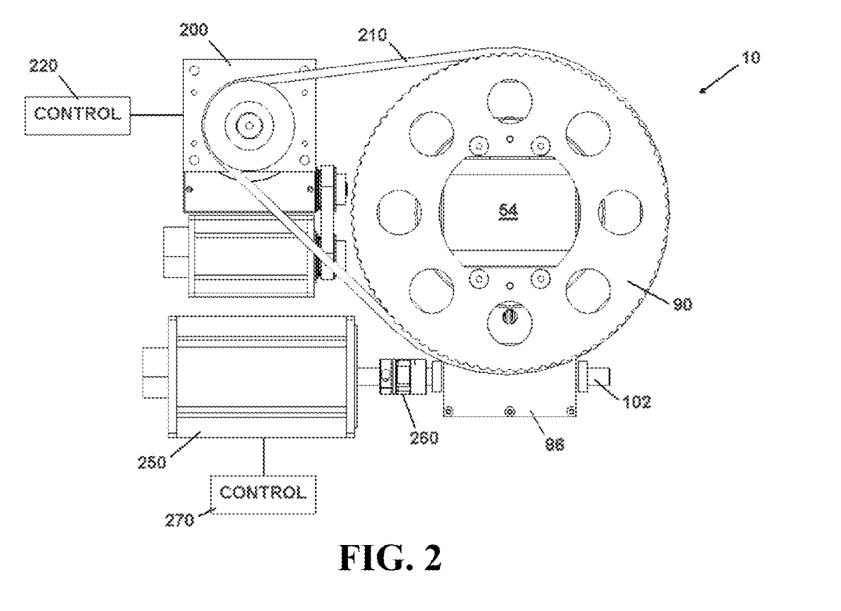
FIG. 2 is an isolated view of one aspect of an omnidirectional drive and steering unit attached to drive and steering motors.
Figure 17:
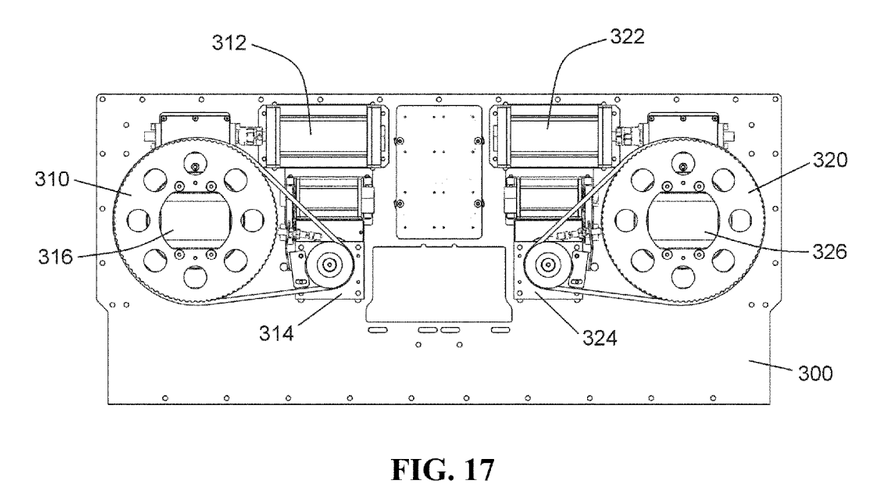
FIG. 17 is a bottom view of one embodiment of an AGV including a pair of omnidirectional drive and steering units.

FIG. 2 illustrates one embodiment of a bottom view of the unit 10 showing the steering gear 90 coupled to a steering motor 200 via a belt 210, and a drive motor 250 coupled to a drive shaft 102 of the drive assembly 18 (see FIG. 1) through a coupling 260. While the embodiment of FIG. 2 shows the steering gear 90 being driven by a belt 210, it will be appreciated that the steering gear 90 could be driven by other means, such as by another gear coming off of the steering motor 200, or through a direct connection with the steering motor 200. Having the steering motor 200 laterally spaced from the steering gear 90 and the rest of the unit 10 aids in maintaining a low profile for the unit 10. The steering motor 200 and drive motor 250 are also preferably independent from each other so that the unit 10 can be independently driven and steered. Each motor 200, 250 is preferably associated with a steering assembly control system 220, a drive assembly control system 270 that is preferably associated with a processor (not shown) that guides the movement and direction of the unit 10 and of an AGV or the like (FIG. 17). If multiple units 10 are employed in an AGV or the like (FIG. 17), then each unit 10 would preferably have its own steering and drive motor assemblies so that each unit 10 can be independently driven and steered relative to the other units 10.

Various methods of assembly of each region will now be described, it being understood that certain aspects of assembly are described and that other aspects and embodiments of assembly are contemplated. Furthermore, while certain methods of construction are described herein, it will be appreciated that such methods of assembly are not limited to the embodiments as shown, or the described order of assembly, but that various methods of assembly in various orders are contemplated.

Figure 4:
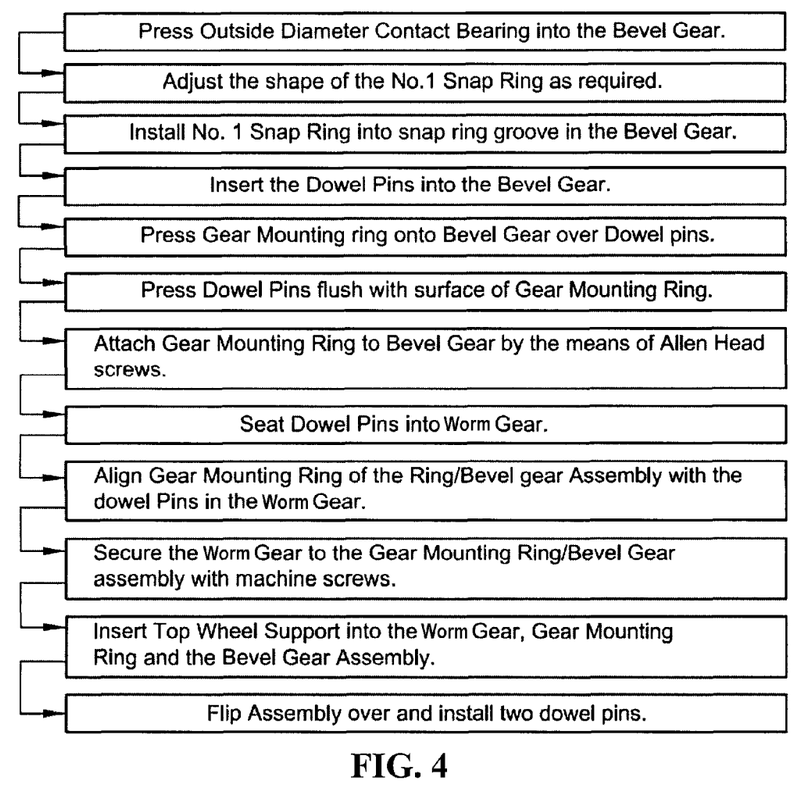
FIG. 4 is a flow diagram of the assembly of one embodiment of one aspect of the omnidirectional drive and steering unit of the invention.

FIG. 3 is an exploded view of the upper case assembly 12, which includes the drive gear assembly consisting of worm gear 24, and bevel gear 26, and FIG. 4 is a flow diagram illustrating one embodiment of assembling the same. In one embodiment, outside diameter contact bearing 30 is pressed into the bevel gear 26 and held in place by snap ring 32 after the shape of the snap ring is adjusted if necessary. The snap ring 32 fits within a snap ring groove (not shown) on the bevel gear 26. Dowel pins 34 are preferably inserted into the bevel gear 26 for alignment with the gear mounting ring 36 when the gear mounting ring 36 is pressed onto the bevel gear 26. The dowel pins 34 are preferably pressed flush to the surface of the gear mounting ring 36, and then the bevel gear 26 is attached to the gear mounting ring 36 by fasteners such as Allen head screws 38 for example. Of course, other types of fasteners may be used. Additional dowel pins 34 are used to align the worm gear 24 with the assembly of the bevel gear 26 and gear mounting ring 36, which are then secured to each other with fasteners such as machine screws 40 to form the drive gear assembly of the worm gear 24, bevel gear 26 and gear mounting ring 36. Top wheel support 76 (see FIG. 1) is inserted into the assembly of the worm gear 24, gear mounting ring 36 and bevel gear 26 and aligned with such assembly with dowel pins.

Figure 5:
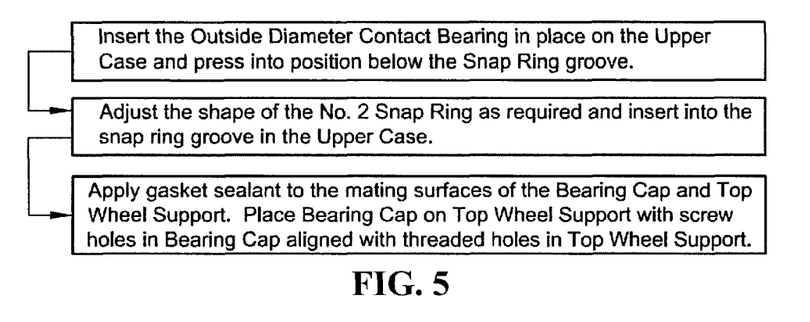
FIG. 5 is a flow diagram of the assembly of one embodiment of an upper case assembly of the invention.

FIG. 5 is a flow diagram illustrating the upper case assembly 12, where outside diameter contact bearing 30 is placed on the upper case 28 and pressed into position below the snap ring groove 83 and snap ring 84 (FIG. 1). The shape of the snap ring 84 is adjusted as required and inserted into the snap ring groove 83 in the upper case 28. Gasket sealant or the like is preferably applied to the mating surfaces of the bearing cap 42 and top wheel support 76. The bearing cap 42 is then aligned with and secured to the top wheel support 76 with bearing cap mounting fasteners or screws 44. As illustrated in FIGS. 1 and 3, top cover 46 is secured to the upper case 28 with mounting fasteners or screws 48.

FIG. 6 is an exploded perspective of the drive wheel 54, wheel drive shaft gear 56 and wheel housing components 14. The wheel drive shaft 58 is shown below the drive wheel 54 along with a long key 60 that engages a slot 55 in the drive wheel 54 and a short key 62 that engages a slot 57 in the wheel drive shaft gear 56. Above the drive wheel 54 is a snap ring 64, laminated shim 66 and drive shaft bearing 68. On the other side of the drive wheel 54 is a laminated shim 66, drive shaft bearing 68, oil seal 70, wheel drive shaft gear 56 and snap ring 64. To the left of the wheel drive shaft 58 in FIG. 6 is lower wheel bearing housing 72, and to the right is an upper wheel bearing support 74 and the top wheel support 76 (see also FIG. 1). The lower wheel bearing housing 72, upper wheel bearing support 74 and the top wheel support 76 are positioned by long dowel pins 78 and attached by fasteners such as, for example, machine screws 80. The top case outside diameter bearing 82 and the snap ring 84 are shown in alignment with the top wheel support 76.

FIG. 7 is one embodiment of a flow diagram of the assembly of the wheel and pinion gear assembly of FIG. 6. The wheel drive shaft 58 is pressed into the drive wheel 54 along with the long key 60 in the keyway (not shown on the drive shaft) until the snap ring groove 59 on the distal end of the wheel drive shaft 58 passes beyond the outside of the drive wheel 54. The snap ring 64 is installed into the snap ring groove 59, the drive wheel 54 is pressed against the snap ring 64, and then laminated shim 66 is placed on the wheel drive shaft 58 on top of the snap ring 64. Another laminated shim 66 is placed on the wheel drive shaft 58 on the opposite side of the drive wheel 54, where the distance between the laminated shims 66 on either side of the drive wheel 54 is preferably approximately 3.125 inches. Other spacing is contemplated depending on the size of the drive wheel 54 and the environment, and some adjustment of the laminated shims 66 may be required. The drive shaft bearings 68 are positioned on the drive shaft 58 on either side of the drive wheel 54. The pinion gear 56 is placed on the wheel drive shaft 58 with a snap ring 64, although preferably not initially using the short key 62 to make corrections in the position of the pinion gear 56 by adjusting the laminated shims 66 on either side of the drive wheel 54. The pinion gear 56 can be removed from the wheel drive shaft 58 to install the oil seal 70 over the wheel drive shaft 58, and then the pinion gear 56 is re-seated on the drive shaft 58 with the short key 62 and snap ring 64. All above-mentioned parts are preferably lubricated at assembly as required.

FIG. 8 is one embodiment of a flow diagram discussing the wheel housing assembly 14 shown in FIG. 6. Mating surfaces of the top wheel support 76 and upper wheel bearing support 74 are preferably coated with gasket sealant and then the top wheel support 76 is positioned over the upper wheel bearing support 74 using alignment dowel pins 78. The wheel and pinion gear assembly described in FIGS. 6 and 7 is placed into the upper wheel bearing support 74 and the lower wheel bearing housing 72 is then pressed onto the dowel pins 78 extending from the upper wheel bearing support 74. Thereafter, the top wheel support 76, upper wheel bearing support 74 and the lower wheel bearing housing 72 are secured by, for example, machine screws 80.

FIG. 9 is an exploded view of one embodiment of the drive assembly 18 comprising a worm assembly 98 including a worm 100 and worm shaft 102 with tapered bearings 104, 106 and shaft seals 112, 114 at either end. While the worm 100 and worm shaft 102 are shown as a single machined part, it will be understood that other methods of manufacture and assembly are contemplated. In addition, while a drive assembly 18 based on a worm drive is shown and described, it will be appreciated that other drive systems will be operable. The worm assembly 98 is attached to the upper and lower cases 28, 86 through the use of worm seal mounting plates 108 and 110 that are secured to the upper and lower cases 28, 86 with threaded fasteners 116 and lock washers 118 or the like. Other methods of securing and fastening are contemplated.

FIG. 10 is an exploded view of one embodiment of the lower case assembly 16 (FIG. 1) or steering gear assembly, comprising the lower case 86, lower case seal 88 and the steering gear 90. The steering gear 90 is attached to the lower wheel bearing housing 72 (FIG. 1) with fasteners 92, such as Allen head screws 92 for example, while other fasteners 94, such as machine screws 94 for example, are used to attach the lower case 86 to the upper case 28 (FIG. 1). As also shown in FIGS. 1, 2 and 17, while the steering gear 90 is disposed outside of the lower case 86 for engagement with a steering motor 200 or the like (FIG. 2), the steering gear 90 also engages the wheel assembly 14 through fixed engagement with the lower wheel bearing housing 72.

Figure 11B:
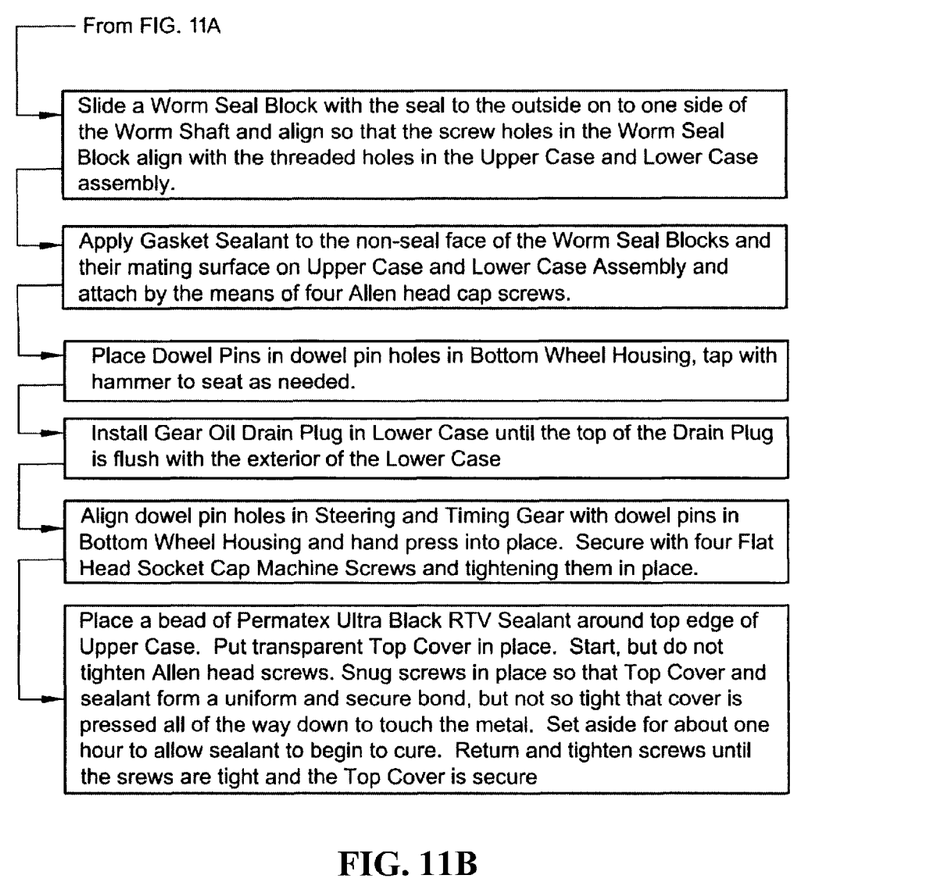

FIGS. 11A and 11B describe one embodiment of an assembly of the upper and lower cases 28, 86 of the unit 10. It will be appreciated that while one non-limiting sequence of assembly is described in some detail, other methods of assembly will be contemplated. First, the lower case oil seal 88 is pressed into the lower case 86 (FIGS. 1, 10). The lower case 86 is then turned over on a work surface (not shown) for applying gasket sealant to the mating edges of both the upper case 28 and the lower case 86 and for lightly greasing the seal mating surface where lower wheel bearing housing 72 meets the lower case oil seal 88 (FIG. 1). Placing the lower case assembly 16 onto upper case assembly 12 and pressing the lip of the lower case oil seal 88 in around the edge of the lower wheel bearing housing 72 ensures an even fit and adequate seal. Machine screws 94, for example, which join the upper case 28 to the lower case 86, are tightened by first tightening the screws in the rectangular area above the worm 100 (FIG. 1) until they are snug and the gasket cement squeezes out, and the remaining screws are tightened to secure the lower case 86 to the upper case 28. The assembly of the upper and lower cases is turned over and it is determined where the pinion gear 56 is currently positioned relative to the bearing cap 42 and such location on the bearing cap 42 is marked. In accordance with one method, a series of punch marks in the bearing cap 42 roughly resembling an arrow shape are made using a hammer and center punch, for example, to mark the location directly over the pinion gear 56. Thereafter, the worm shaft seal 112 (FIG. 9) is advanced slightly onto the worm seal mounting plate 108 with the open side of the seal 112 going in towards a stop machined into the worm seal opening in the plate 108. The worm shaft seal 112 and worm seal mounting plate 108 are then placed in an arbor press, with the worm seal side up for squaring and centering the worm seal mounting plate 108 under the arbor press, and the seal 112 is then pressed into the worm seal mounting plate 108. The mounting plate 108 with seal 112 is then advanced or slid onto one side of the worm shaft 102 and aligned so that the screw holes 107 (FIG. 9) in the worm seal mounting plate 108 align with the threaded holes 27, 87 (FIG. 1) in the upper case 28 and lower case 86 assembly. Gasket sealant is then applied to the non-seal face of the worm seal mounting plate 108 and 110 and their mating surfaces on upper case 28 and lower case 86 assembly and the plates 108, 110 are attached by fasteners such as, for example, Allen head cap screws 116 (FIGS. 1, 9). Dowel pins in dowel pin holes are placed in lower wheel bearing housing 72 and tapped with a hammer to seat as needed. A gear oil drain plug (not shown) is installed in the lower case 86 until the top of the drain plug is flush with the exterior of the lower case 86. Dowel pin holes in the steering gear 90 are aligned with dowel pins in the lower wheel bearing housing 72 and hand pressed into place and then secured with, for example, flat head socket cap machine screws 92 and tightened in place (FIGS. 1, 10). A bead of sealant (not shown) is placed around the top edge of the upper case 28 and then a preferably transparent top cover 46 is placed thereon. Fasteners 48, such as Allen head screws 48 for example, are initially tightened to form a uniform and secure bond between the top cover 46 and upper case 28, but not tightened so much so that the cover 46 is pressed all of the way down to touch the upper case 28. Once the sealant has cured, usually in about one hour, the fasteners 48 can be tightened completely to form a secure connection between the top cover 46 and the upper case 28.

Figure 12:
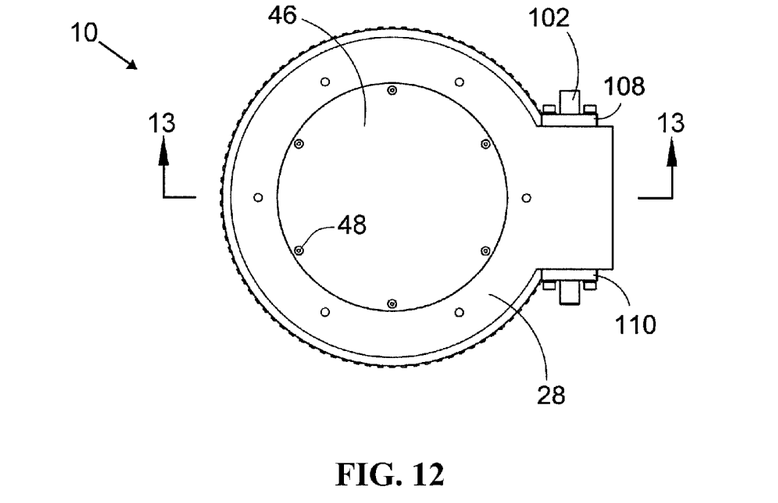
FIG. 12 is a top view of the omnidirectional drive and steering unit, constructed in accordance with the present invention.

FIG. 12 is a top view of one embodiment of the unit 10 showing the preferably transparent top cover 46, upper case 28, worm shaft 102 and worm seal mounting plates 108 and 110. While the top cover 46 is illustrated with some transparency, it will be appreciated that he top cover 46 could also be semi-transparent, translucent, solid or a combination of the same as desired.

Figure 13:
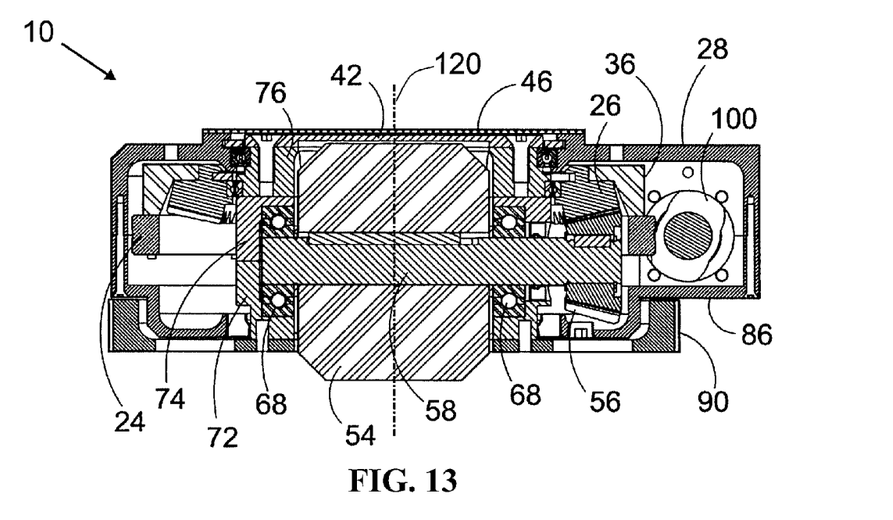
FIG. 13 is a cross-section taken along line 13-13 of FIG. 12.

FIG. 13 is a cross-section taken along line 13-13 of FIG. 12, and illustrates the compact construction of the unit 10. As the unit 10 is preferably to be incorporated into an AGV or the like, and in some situations the AGV would have to maneuver with very little height clearance, it is preferred that the height of the unit 10 taken along a central axis 120 through the wheel 54 and normal to the ground (not shown) is approximately four inches. Of course, other dimensions are contemplated for other environments and clearance considerations.

Figure 14:
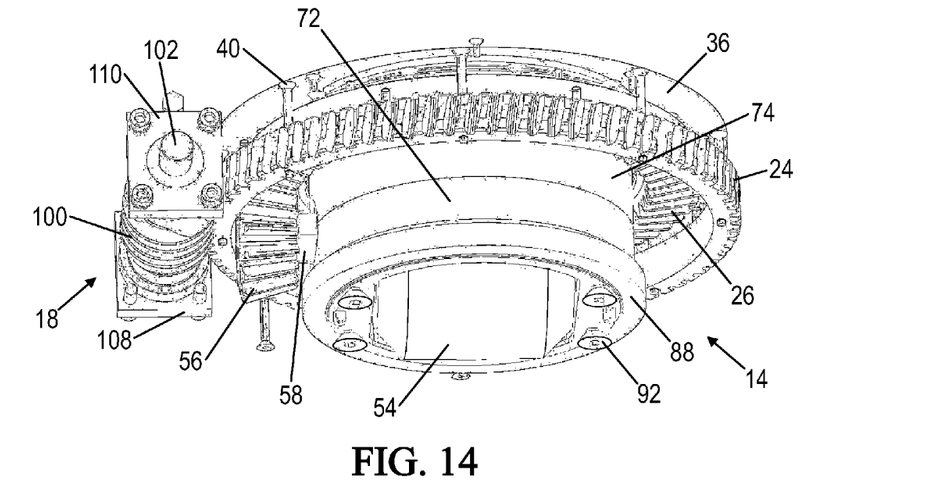
FIG. 14 is a perspective view taken from the bottom of one embodiment of certain sections of the omnidirectional drive and steering unit of the invention.
Figure 15:
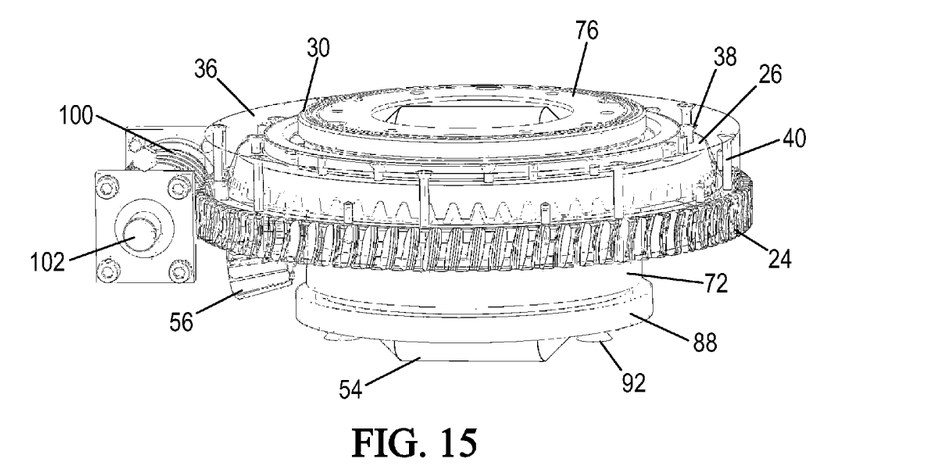
FIG. 15 is a perspective view taken from the side of one embodiment of certain sections of the omnidirectional drive and steering unit of the invention.

FIG. 14 is a perspective view taken from the bottom and FIG. 15 is a perspective view taken from the side of one embodiment of certain sections of the unit 10, other sections being omitted for purposes of illustrating and demonstrating the manner in which the drive assembly 18 drives the drive wheel 54. Specifically, the worm 100 meshes with the worm gear 24 such that a rotation of the worm 100 along the axis of the worm shaft 102 causes an omnidirectional rotation of the worm gear 24 about a central axis 120 (FIG. 13) of the unit 10. The rotation of the worm gear 24 results in a rotation of the bevel gear 26 through the fixed assembly of the worm gear 24 with the bevel gear 26 via the gear mounting ring 36 (see, for example, the discussion of FIG. 3). The pinion gear 56 meshes with the bevel gear 26 (FIG. 14) such that rotation of the bevel gear 26 causes a rotation of the pinion gear 56 about the drive shaft 58 of the wheel 54, which causes a rotation of the drive shaft 58 that drives the wheel 54 clockwise or counterclockwise (forward or backward) as desired.

Figure 16:
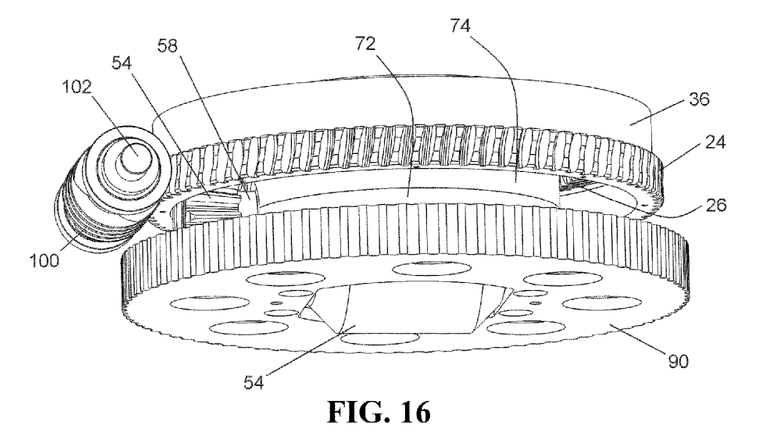
FIG. 16 is a perspective view taken from the bottom of one embodiment of certain sections of the omnidirectional drive and steering unit of the invention.

FIG. 16 is a perspective view taken from the bottom of certain sections of the unit 10, other sections being omitted for purposes of illustrating and demonstrating the manner in which the wheel 54 is steered. The wheel 54 is steered through the engagement of the steering gear 90 (FIGS. 1, 10, 16) with the lower wheel bearing housing 72, which is fixed to the upper wheel bearing support 74 and the top wheel support 76 (see FIG. 6) to form part of the wheel housing assembly 14 (FIG. 1). The wheel housing assembly 14 is rotatable within the upper and lower cases 28 and 86 via bearings 30, 82, 88 (FIG. 1). Rotation of the wheel 54 and the wheel housing assembly 14 (FIG. 1) is accomplished by rotation of the steering gear 90 (FIGS. 2, 16), which causes the wheel housing assembly 14 to rotate along the central axis 120 (FIG. 13) of the wheel 54 relative to the assembly of gear mounting ring 36, bevel gear 26 and worm gear 24. More specifically, omnidirectional rotation of the wheel housing assembly 14 is guided through the engagement of the pinion gear 56 with the bevel gear 26, which occurs independently of the interaction of the drive assembly 18 with the pinion gear 56. Thus, the pinion gear 56 functions to translate the rotation of the bevel gear 26 to the drive shaft 58 (see FIG. 14) to drive the wheel 54, and at the same time it functions to guide the rotation of the wheel 54 relative to the upper and lower cases 28 and 86 for turning the wheel about the axis 120 (FIG. 13). The driving and steering of the wheel 54 can occur independently or simultaneously as desired and depending on the control systems 200, 270 that control the drive and steering motors 250, 200 (FIG. 2).

FIG. 17 illustrates one embodiment of a bottom view of an AGV 300 or the like with two drive and steering units 310, 320, each having a drive motor 312, 322 and a steering motor 314, 324. The units 310, 320 are independently arranged to provide independent driving and steering of the wheels 316, 326 relative to each other and to the AGV 300. While FIG. 17 illustrates two units 310, 320, it will be appreciated that any number of units can be implemented on an AGV or the like, such as, for example, one on each corner of the AGV if desired.

In one non-limiting embodiment, the omnidirectional drive and steering unit has a single, independently operating gear unit and housing surrounding a single, centrally located wheel, which due to the unique configuration of the unit assembly provides the ability for the wheel, and any support structure or vehicle it is a part of, to be turned for steering and drive purposes in any direction. This also includes the ability for the unit to drive and steer simultaneously, to stop and immediately reverse direction, and the ability of the wheel within the unit to be turned either clockwise or counterclockwise, in full circles or any portion thereof, either singly, or in conjunction with other similar omnidirectional drive and steering gear units. In addition, the unit is preferably designed to be very robust and to perform all of these operations while bearing a very large load and providing a significant amount of torque relative to the overall size of the unit.

Returning to FIGS. 12 and 13, it will be seen that the weight from a load (not shown) placed on the top of the unit 10 is conveyed to the wheel 54 through the mounting fasteners 48 connection to the upper and lower wheel bearing supports 74, 72. This arrangement, coupled with the unique configuration of the laterally offset drive assembly 18 and driving gear arrangement that is coaxial with the central axis 120 of the wheel 54, provides for a durable, compact construction that enables a large load to be placed directly on top of the unit 10 for omnidirectional movement of the load without altering the orientation of the load relative to the unit 10. This is a significant departure from the conventional forklift-type arrangement where the load is separated from the drive and steering mechanisms.

In one non-limiting application, an AGV which picks up an automobile by lifting under the automobile's tires, carrying an automobile forward, backward or sideways (perpendicular to an automobile's normal forwards/backwards travel orientation) through travel lanes and other components of an automated storage system, uses four coordinated versions of the omnidirectional drive and steering units to move the automobile quickly and efficiently to and from storage locations while requiring the absolute minimum possible building space and system footprint to accommodate vehicles of the size desired.

In another non-limiting application, an AGV, with direction from other devices, sensors, measuring implements, or human intervention, implements the capabilities of the omnidirectional drive and steering units to easily and quickly shift relative location or orientation to a target item which is not situated exactly correctly relative to its normal pick up location. This system would eliminate the need for several adjustment maneuvers (similar to a three point turn) that are normally required to respond to a variation in pick up location, and could be used to handle irregularly shaped items or items which were placed imprecisely by imperfect human or mechanical operations. For example, items unloaded into an automated warehouse by human workers and not placed exactly "on center" in a loading area could be detected by sensors in the loading area and an AGV equipped with the units of present invention could shift as needed to correctly approach and acquire the target item, then shift back to center as needed to transport the acquired item to the appropriate location within the system.

Other non-limiting examples include applications that are not fully automated but where the advanced maneuverability provided by the omnidirectional steering and drive units allows human directed vehicles to operate more efficiently than existing steering and drive systems allow. Another application allows asymmetrical items which, for example, might be long and narrow, to be transported by omnidirectional AGVs or human guided vehicles down a travel lane that was wide enough to accommodate their length (for example), then shifted sideways following a different axis into narrower storage lanes and/or storage racks without having to allow for room for turning radii to turn the AGV or load within or in to the storage aisles.

Other non-limiting uses of an omnidirectional drive and steering unit include the movement of stage or set components in theatre performances or stage productions; platform movement in display or theatrical environments; hospital patient transport on carts or patient movement in medical scanners; movement or sorting of large items in manufacturing applications or use in factories; production machinery and materials handling and movement; bomb removal and suspicious package retrieval robots; people moving and transport mechanisms; product packaging, package handling and sorting systems; and Transfer Tables for moving and positioning large components in fabricating or manufacturing environments.

While the present invention has been described at some length and with some particularity with respect to the several described embodiments, it is not intended that it should be limited to any such particulars or embodiments or any particular embodiment, but it is to be construed with reference to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

We claim:

1. An omnidirectional drive and steering unit comprising:
    a drive assembly that engages a drive gear assembly;
    a wheel assembly driven by the drive gear assembly and including a drive wheel having a central axis, a wheel drive shaft and a wheel drive shaft gear attached to said wheel drive shaft;
    the drive gear assembly being coaxial with the central axis; and
    a steering gear assembly attached to the wheel assembly and being coaxial with the central axis,
    wherein the drive assembly further comprises a worm and a worm shaft;
    wherein the drive gear assembly further comprises a worm gear attached to a bevel gear, the worm gear meshing with the worm; and
    wherein the wheel drive shaft gear meshes with the bevel gear whereby when said worm shaft is rotated, said worm rotates and translates movement to said worm gear and bevel gear, which translates movement to said wheel drive shaft gear and wheel drive shaft, rotating said wheel drive shaft and driving said wheel; and
    wherein said drive wheel is driven in the forward or reverse direction depending on the rotation of the worm shaft.

2. The omnidirectional drive and steering unit according to claim 1, further comprising a drive assembly control system associated with the drive assembly, and further comprising a steering assembly control system associated with the steering assembly.

3. The omnidirectional drive and steering unit according to claim 1, wherein the drive assembly and the steering gear assembly are operable independently or simultaneously.

4. The omnidirectional drive and steering unit according to claim 1, wherein movement of said steering gear assembly translates into movement of said wheel drive shaft gear relative to said drive gear assembly.

5. The omnidirectional drive and steering unit according to claim 1, wherein the wheel assembly further comprises a wheel bearing housing and the steering gear assembly is attached to the wheel bearing housing of the wheel assembly.

6. The omnidirectional drive and steering unit according to claim 1, wherein the omnidirectional drive and steering unit is attached to a vehicle.

7. The omnidirectional drive and steering unit according to claim 6, further comprising a plurality of omnidirectional drive and steering units attached to an automatic guided vehicle (AGV).

* * * * *